(12) United States Patent
Lyon-Smith et al.

(10) Patent No.: US 9,239,886 B2
(45) Date of Patent: Jan. 19, 2016

(54) PARTITIONED LIST

(75) Inventors: John S. Lyon-Smith, Redmond, WA (US); Abhijit Rao, Seattle, WA (US); Sergey Grankin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 859 days.

(21) Appl. No.: 12/632,822

(22) Filed: Dec. 8, 2009

(65) Prior Publication Data

US 2011/0137899 A1 Jun. 9, 2011

(51) Int. Cl.
*G06F 7/00* (2006.01)
*G06F 17/30* (2006.01)

(52) U.S. Cl.
CPC ............................ *G06F 17/30961* (2013.01)

(58) Field of Classification Search
None
See application file for complete search history.

(56) References Cited

U.S. PATENT DOCUMENTS

| | | | |
|---|---|---|---|
| 5,787,284 A | 7/1998 | Blainey et al. | |
| 6,226,787 B1 | 5/2001 | Serra et al. | |
| 6,345,295 B1* | 2/2002 | Beardsley et al. | 709/224 |
| 6,418,443 B1* | 7/2002 | Martin, Jr. | 1/1 |
| 7,058,928 B2 | 6/2006 | Wygodny et al. | |
| 7,496,729 B2* | 2/2009 | McIntosh et al. | 711/173 |
| 2002/0124215 A1* | 9/2002 | Austen et al. | 714/57 |
| 2004/0199530 A1* | 10/2004 | Avadhanam et al. | 707/100 |
| 2006/0242627 A1* | 10/2006 | Wygodny et al. | 717/128 |
| 2007/0156794 A1* | 7/2007 | Kisley et al. | 707/204 |
| 2008/0162585 A1* | 7/2008 | Takahashi | 707/200 |
| 2008/0263309 A1* | 10/2008 | Attinella | 711/173 |
| 2008/0288558 A1 | 11/2008 | De Pauw et al. | |
| 2009/0007075 A1* | 1/2009 | Edmark et al. | 717/128 |
| 2009/0063578 A1* | 3/2009 | D'Angelo et al. | G06F 17/30306 1/1 |
| 2009/0089334 A1* | 4/2009 | Mohamed et al. | 707/200 |

OTHER PUBLICATIONS

Ding, et al., "Automatic Software Fault Diagnosis by Exploiting Application Signatures", Retrieved at http://www.usenix.org/event/lisa08/tech/full_papers/ding/ding_html/>> in the proceedings of the 22nd Large Installation System Administration Conference, Nov. 9-14, 2008, pp. 23-39.

Rival, et al., "The Trace Partitioning Abstract Domain", Retrieved at http://www.di.ens.fr/~rival/toplas07.pdf>> ACM Transactions on Programming Languages and Systems, vol. 29, No. 5, Aug. 2007, pp. 1-44.

Jones, Tim, M., "Visualize function calls with Graphviz", Retrieved at <<http://www.ibm.com/developerworks/library/I-graphvis/>> Jun. 21, 2005, pp. 10.

(Continued)

*Primary Examiner* — Hosain Alam
*Assistant Examiner* — Thu Nga Nguyen
(74) *Attorney, Agent, or Firm* — Kevin Sullivan; Kate Drakos; Micky Minhas

(57) ABSTRACT

Initial items can be partitioned into a plurality of partitions. The partitions can be stored in a partitioned list in computer storage. An index to the partitions can be generated. One or more initial items can be invalidated, and additional items can be appended to the partitioned list in a storage space previously occupied by the invalidated initial items. The index can be updated to omit references to the invalidated items, and to include references to the additional items. Also, a slice of an application call tree can be generated from a partition loaded into memory from a log. A representation of the slice can be displayed on a computer display, even before the entire application call tree is generated from the log.

20 Claims, 12 Drawing Sheets

(56) References Cited

OTHER PUBLICATIONS

Mauborgne, et al., "Trace Partitioning in Abstract Interpretation Based Static Analyzers", Retrieved at http://www.di.ens.fr/~rival/esop05_partitioning.pdf>> 2005, vol. 3444, pp. 16.

Flemming, Matt, "How B-Tree Database Indexes Work and How to Tell if They are Efficient (100' Level)", Retrieved at <<http://mattfleming.com/node/192>> Submitted Feb. 22, 2007, pp. 3.

Rao, et al., Building an Application Call Graph from Multiple Sources, U.S. Appl. No. 12/634,691, filed Dec. 10, 2009, pp. 1-41 & Drawing Sheets 1-13.

\* cited by examiner

PARTITIONED LIST

BACKGROUND

Extremely large read-only data files, such as log files collected during application tracing, are often processed, such as to extract information in the log files and/or analyze the information in the log files. For example, log files can be used to generate call trees that represent calls made while a traced application is running.

SUMMARY

Large compilations of information, such as application trace log files, can be difficult to work with because they are often too large to be loaded into system memory. Moreover, even if the files can be loaded into system memory, computer systems often take a long time to process the files, such as when log files are processed to generate application call trees. The tools and techniques described herein can include partitioning techniques, which may address these and/or other problems with prior techniques for storing and/or processing data list structures, such as data trace log files.

In one embodiment, the tools and techniques can include retrieving event items from tracing a running application, where each event item represents an event from the tracing. The event items can be partitioned into a plurality of partitions. As used herein, a partition is a grouping one or more items so that the items can be manipulated as a group. For example, the manipulation could include accessing the items as a group, loading the items into memory as a group, saving the items as a group, invalidating the items as a group, and/or other manipulations. The partitions can be stored in a log. A log is a data structure that stores items. A log can take various forms, such as a single log file, a log within a file that includes multiple logs, a log that includes one or more data files and one or more index files, etc. An index to the partitions can be generated, and one or more event items can be accessed using the index.

In another embodiment of the tools and techniques, initial items can be partitioned into a plurality of partitions. The partitions can be stored in a partitioned list in computer storage. A partitioned list is a data structure in which items are partitioned. For example, a partitioned list can be a log where items are partitioned. An index to the partitions can be generated, and can include a set of index references corresponding to the initial items. Initial items can be invalidated, and additional items can be appended to the partitioned list in a storage space previously occupied by the invalidated initial items. The index can be updated to omit references to the invalidated items, and to include references to the additional items.

In yet another embodiment of the tools and techniques, a partition of an application trace log can be loaded into memory. The log can include multiple such partitions. A slice of an application call tree can be generated from the loaded partition. A call tree slice is a call tree portion that is less than all of an application call tree. A representation of the slice can be displayed on a computer display, even before the entire application call tree is generated from the log.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
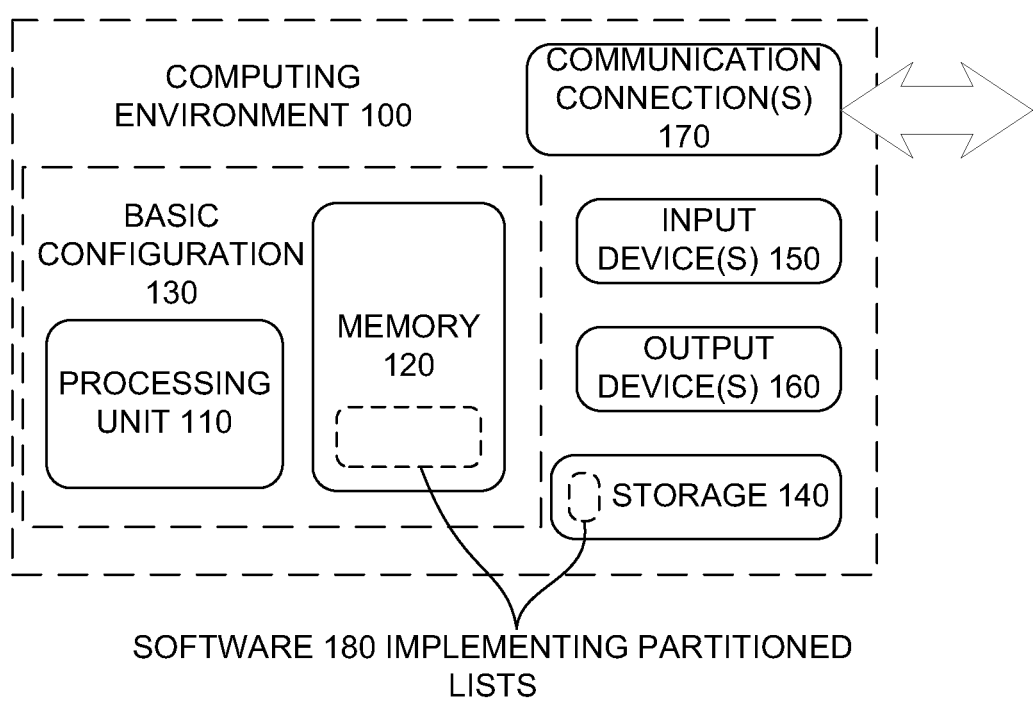
FIG. 1 is a block diagram of a suitable computing environment in which one or more of the described embodiments may be implemented.

Embodiments described herein are directed to techniques and tools for storing and/or processing partitioned lists, such as partitioned lists in application trace log files. As used herein, a partitioned list refers to a partitioned data structure, such as a data structure where additional items can be appended to the structure within an existing partition or in a new partition. Improvements may result from the use of various techniques and tools separately or in combination.

Such techniques and tools may include partitioning items in a partitioned list, such as event items in a data trace log file. Each resulting partition in the partitioned list can include one or more of the items (such as events in a data trace log file). Additionally, an index of the partitions can provide easy access to the items. The partitioned list can improve performance while processing the list, such as by allowing one or more partitions to be loaded into memory without loading the entire list.

When additional items become available, they can be appended to the partitioned list. Moreover, items that are already in the partitioned list can be invalidated, so that the appended additional items can be stored in the same locations where the invalidated items had previously been stored. This may be beneficial to keep the size of the partitioned list from becoming too large. For example, older items can be invalidated as new items are appended to keep the partitioned list from exceeding a specified maximum storage size.

In addition, where the partitioned list is an application trace log data structure, such as an application trace log file, a single partition can be used to generate a slice of an application call tree corresponding to events in the partition. For example, call tree slices can be constructed from partitions that may represent processing of children of a particular application call tree node, so that a portion of an application call tree can be displayed without generating the entire call tree. Accordingly, one or more relevant portions of an application call tree can be displayed before the entire application call tree has been generated, providing faster response to a user requesting display of that portion of the application call tree.

Accordingly, one or more substantial benefits can be realized from the partitioned list tools and techniques described herein. However, the subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various techniques described herein may be implemented with hardware or software, or a combination of both. Moreover, for the sake of simplicity, flowcharts may not show the various ways in which particular techniques can be used in conjunction with other techniques.

I. Exemplary Computing Environment

FIG. 1 illustrates a generalized example of a suitable computing environment (100) in which one or more of the described embodiments may be implemented. For example, one or more such computing environments can be used as an environment for generating and/or using partitioned lists. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing partitioned lists.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Partitioned List System and Environment

Figure 2:
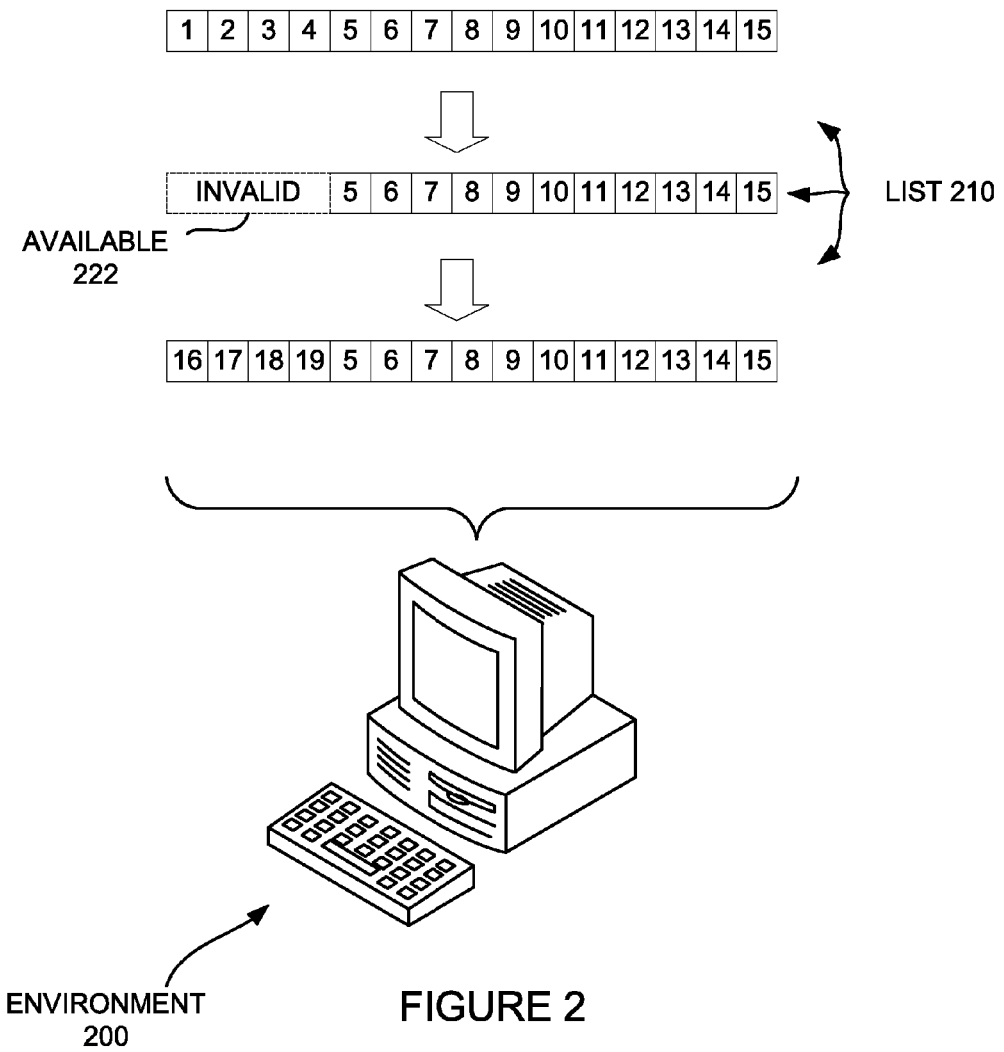
FIG. 2 is a schematic diagram of a partitioning environment.

FIG. 2 is a schematic diagram of a partitioning environment (200) in conjunction with which one or more of the described embodiments may be implemented. The partitioning environment (200) can include a partitioned list (210). The numbered boxes in FIG. 2 illustrate items in the list, with the numbers ascending in accordance with the time in which the items were added to the list (210). The items themselves may be read-only items. However, new items may be appended to the list (210), and old items may be invalidated, such as to provide available space. For example, in FIG. 2, several instances of the list (210) are illustrated as time goes by. In an initial list (210) (the top list), the list (210) includes items 1-15. In the first modified version of the list (210) (the middle list), items 1-4 have been invalidated to provide available space (222). Accordingly, after items 1-4 have been invalidated, attempts to access those items will result in errors, and the space where the items had been stored is now available. Accordingly, new items 16-19 can be appended to the list (210), as is illustrated in the bottom version of the list (210).

Despite the invalidating and appending operations, the remaining items 5-15 in the list (210) can remain in the same physical storage, and logical index references (e.g., logical references such as file offsets, which can correspond to physical index references such as offsets in physical storage, which can correspond in turn to storage and/or memory locations) to the remaining items can remain unchanged. However, the data structure for the list can include an indication of the absolute logical index reference (the logical offset within the entire list) for the first item in the list. The absolute logical index reference of the first valid item in the list can continue to grow over time, as additional old items are invalidated. Moreover, additional items can continue to be appended to the list, with the appended items having increasingly larger logical index references. However, the physical index references for items that have been invalidated may be reused. When an item is written to a previously-invalidated slot in the partitioned, the item's logical index reference can be greater than that of the previous item, but its physical index reference might wrap around to a lower index reference value, based on the size of the list.

Figure 3:
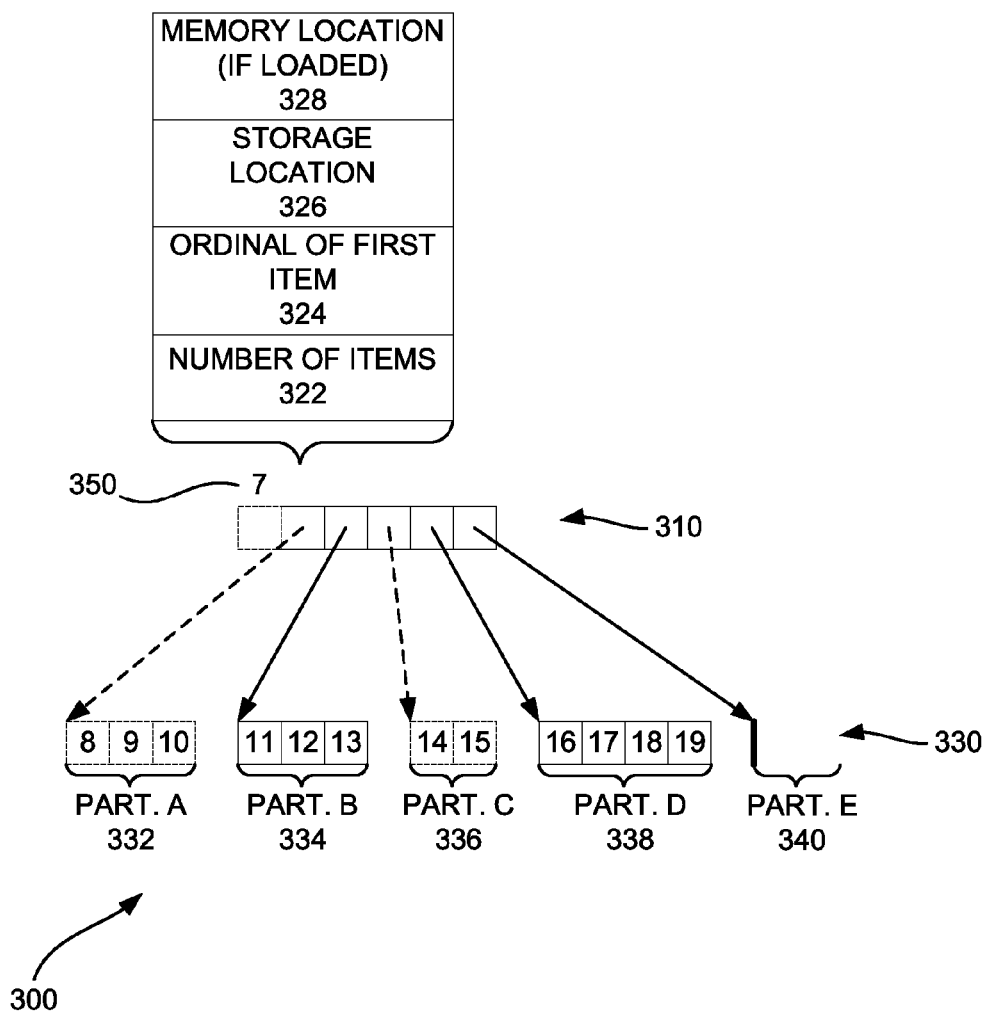
FIG. 3 is a block diagram of an in-memory partitioned list data structure.

Referring now to FIG. 3, an in-memory partitioned list data structure (300) will be discussed. The data structure (300) can be a two layer tree. The top layer can be a logical index (310). Each index entry in this list can include a count (322) of the number of entries in the partition, the absolute logical index reference (324) of the first item in the partition, storage location information (326) about where that partition is stored in the disk file, and a pointer (328) to the partition data if the partition is loaded in memory. The index (310) can also be stored in storage in the same file as the partitioned list (210), illustrated in FIG. 2, or as a separate file.

The bottom layer can include partitioned data (330). The partitioned data (330) in the illustrated example currently includes five partitions: partition A (332), partition B (334), partition C (336), partition D (338), and partition E (340), with 3, 3, 2, 4, and 0 items, respectively. Each partition (332, 334, 336, 338, and 340) can include one or more items (and the last partition (340) may include no items, as illustrated). Partitions (334, 338, and 340) that are currently loaded in memory are illustrated with solid lines, while partitions (332, 336) that are not currently loaded in memory are illustrated with dashed lines. As illustrated, partition B (334), partition D (338), and partition E (340) are currently loaded in memory. Partition A (332) and partition C (336) have been unloaded from memory.

Partitions may be loaded or unloaded, depending on the need for access to the partitions and/or the memory pressure in the computing environment. For example, if item 14 or 15 in the partitioned data (330) is accessed, this can cause the data for partition C (336) to be reloaded to memory from storage (such as by using the storage location information (326) in the index). It is also possible to use a weak memory reference to an unloaded partition. A weak memory reference to an object is a memory reference that does not protect the referent object from removal from memory when a computing system attempts to reclaim memory occupied by objects that are no longer in use by programs. However, if memory pressure is not high, then access to the storage area for the partitioned data (330) referred to by a weak memory reference can be avoided. In some implementations, it may be useful to have only a small number of the most recently used partitions kept in memory at any one time to reduce application memory pressure.

A record (350) can also be kept of the number of items (seven in the example) in the partitioned data (330) before the current first valid item (a valid item or other valid data can be that which has not been deleted from the beginning of the list) in the partitioned data (330). Records of how many partitions those 7 invalidated items were divided up into may not be kept. The data for the corresponding invalidated partitions has been deleted from storage. However, because the record (350) of the number of invalidated items is kept, any indexes into the valid items in the partitioned data (330) can remain unchanged after the invalidated partitions are removed. This persistence of the ordered numbering, or index references, of items in the partitioned data (330) can allow items in the partitioned data (330) to refer to other items without requiring all references to be updated when partitions are invalidated.

In a partitioned list structure (300), it is typically assumed that there is at least one partition. The last partition (340) in the partitioned data (330) may contain zero (as illustrated) or more items, while it is typically assumed that other partitions do not have a zero length. Additional items can be appended to the partitioned data (330) by adding them to the end of this last partition (340), until a new partition is added.

Various mechanisms may be employed to divide the stored data up into partitions. For example, the absolute physical index value and logical index value in the storage file of selected items (e.g., items 8, 11, 14, and 16 in FIG. 3) can be recorded as the items are written out to storage. For example, those selected items can each be the first item in a partition. The selected items can be selected such that the total size or count of items in each partition is approximately the same, and/or so that the size of each partition corresponds with storage allocation units (sectors, block sizes, etc.) of storage device(s) where the partitioned data (330) is to be stored. For example, the size of each partition may be a multiple of the storage allocation unit size for the storage device(s).

An item in the partitioned data (330) may be accessed using its partition index reference (such as the logical index reference for the first item in the partition) and its index reference within that partition (such as an offset in the partition) as an ordered set of two index references. Additionally, an item in the partitioned data (330) can be accessed by using the absolute logical index reference of the item in the entire list, but this can involve searching for the correct partition. Attempts to access items in the partitioned data (330) before the first valid item or after the last item in the partitioned data (330) can result in an error.

III. Partitioned List Format

Partitioned lists can be formatted in various ways. For example, a single partitioned list can be included in a file, where the file includes the items in the list, and the partition index that facilitates access to the partition structure. As yet another alternative, the list items can be included in one file, and the partition index can be included in a different file. As another example, a single file can include multiple partitioned lists.

A. Example of a Block-Based File Format for a Partitioned List

Figure 4:
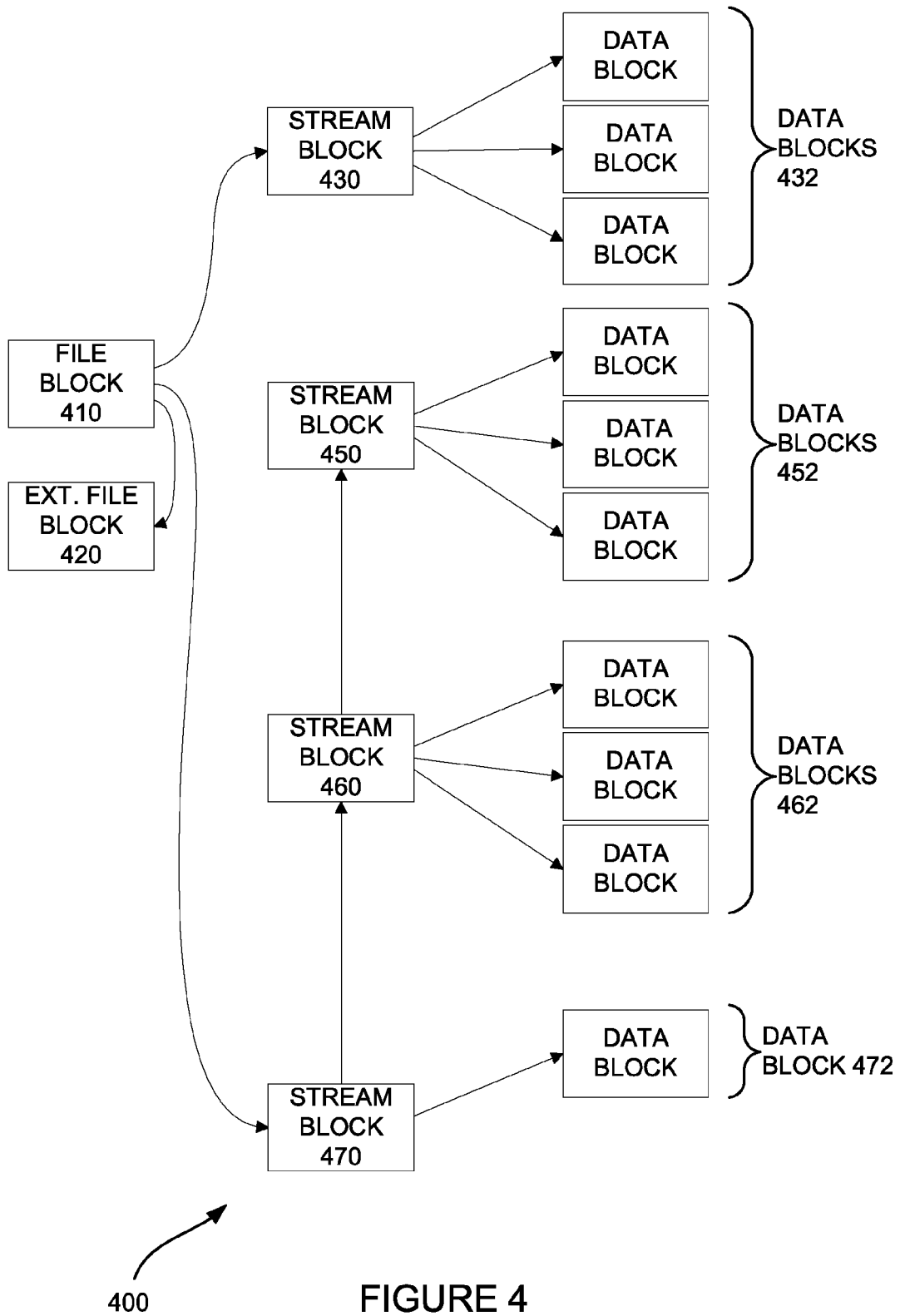
FIG. 4 is a block diagram illustrating an example of a format of a partitioned list data structure.

Referring now to FIG. 4, an example of a format of a partitioned list data structure is illustrated, where a single file (400) can include the items in the list, and the partition index that facilitates access to the partition structure. This format is provided as an example, but the partitioned lists can be implemented in various different ways, which may include some, all, or none of the specific fields, blocks, structure, etc. discussed with reference to the file format of FIG. 4. For example, one or more of the fields listed herein (such as FileIndentifier and/or FirstExtensionBlockOffset) may not be used in implementing partitioned lists. Also, one or more of the features of the file (400) may be used to store data other than partitioned lists. The smallest allocation unit in the file (400) can be a block, so that the file (400) can grow by units of a block. The block size can be user-definable, and users can consider memory page size and storage allocation unit size (e.g., sector size) as factors in defining the size. The block size can be specified in terms of bytes of each block. A block offset can be the physical offset of the block in the file. An extent can be a contiguous sequence of blocks, and an extent offset can be an offset of the first block in an extent. The file (400) can include four types of blocks: file blocks, file extension blocks, stream blocks, and data blocks. The file (400) may include multiple data streams, where each stream contains a partition in a partitioned list, and each stream may include multiple data blocks, where each data block contains one or more items in the partition.

1. File Blocks and Extension File Blocks

The file (400) can begin with a file block (410), which may also point to an extension file block (420) if a maximum size of the file block (410) has been exceeded. Each extension file block (420) may point to another extension file block if the maximum size of the extension file block (420) is exceeded. In this manner, additional extension file blocks (420) can continue to be added, as maximum file block sizes are reached.

The file block (410) can be the first block in the file (400). The file block may include fields such as the following:

| Field | Type | Size | Description |
|---|---|---|---|
| FileIndentifier | Byte | 8 | ASCII characters that identify the file type in a hex editor. Can be "VSMSLF1\0". |
| FileBlockFlags | Byte | 1 | File status flags 0x01: Log file closed cleanly. |
| BlockSize | UInt32 | 1 | Block size of the file. Choosing smaller block sizes can limit the number of streams that the file can support before an extension file block (420) is added. |
| MaximumFileSize | UInt64 | 1 | Maximum size for the file (400) (which can include metadata blocks). This field can be used to set a maximum limit, which can allow the file (400) to operate in a circular-buffer scenario (e.g., where older data blocks can be invalidated and replaced with newer data blocks after the limit is reached). A value of zero can mean there is no limit. |
| FirstExtensionBlockOffset | UInt64 | 1 | This field can point to the file offset of the first extension block (420). In some implementations, an extension block is only allocated if the number of streams exceeds the space available in the file block (410). A value of zero can mean that there is no extension file block (420). |
| FirstFreeExtentOffset | UInt64 | 1 | Offset of first free extent of blocks in the log file. These extents can be chained together in a singly linked list. |

-continued

| Field | Type | Size | Description |
|---|---|---|---|
| [StreamBlockEntries] | [Multiple fields] | N | See description below |

In this example file format, the stream block entries (StreamBlockEntries) in the file block (410) referenced in the table above can form the partitioned list index discussed above. Each of the stream block entries can include fields such as the following:

| Field | Type | Size | Description |
|---|---|---|---|
| StreamFlags | UInt32 | 1 | Stream Flags: 0x00000001: Stream exists |
| StreamType | Byte | 16 | A GUID that indicates the type of data in the stream |
| StreamStart | UInt64 | 1 | The logical offset of the beginning of the stream (which can serve as the pointer to the first item in the partition). There is no data for stream offsets less than this. This value can be less than or equal to StreamLength. This value can be increased as data blocks in the stream are invalidated. |
| StreamLength | UInt64 | 1 | The logical length of the stream. There is no data for stream offsets greater than or equal to this. This value may be 0. The StreamLength can be increased as new data blocks are appended to the stream. |
| LastStreamBlockOffset | UInt64 | 1 | The file offset of the last stream block in the stream block chain. A 0 value indicates that the stream has no blocks allocated for it. |

Extension file blocks may include fields such as the following:

| Field | Type | Size | Description |
|---|---|---|---|
| NextExtensionBlockOffset | UInt64 | 1 | The offset of the next extension block, if there is one; otherwise this field is zero. |
| [StreamBlockEntries] | [Multiple fields] | N | See description above |

2. Stream Blocks and Data Blocks

Each file block (410) can point to one or more stream blocks (such as in the stream block entries discussed above). For example, in the implementation shown, the file block (410) can point to a stream block (430), which can include entries pointing to data blocks (432). Thus, the index in the file block (410) and any extension file blocks (420) can partition the data blocks (432) into a partitioned list. When a stream block reaches a maximum block size and it is still desirable to add more data blocks to the stream, a new stream block can be formed, and the new stream block can point back to the previous stream block, forming a linked list of stream blocks, which can each include entries pointing to data blocks in the stream. For example, as illustrated in FIG. 4, a first stream block (450) for a second stream can include indices pointing to data blocks (452). A second stream block (460) (which was created when the first stream block (450) reached a maximum size) can point back to the first stream block (450) and can include indices pointing to data blocks (462). A third stream block (470) (which was created when the second stream block (460) reached a maximum size) can point back to the second stream block (460) and can include indices pointing to a data block (472). Thus, a stream (which can contain a partition) can include the data blocks (452) indexed by the first stream block (450), the data blocks (462) indexed by the second stream block (460), and the data block (472) indexed by the third stream block (470). Additional data blocks can be appended to this stream by adding them after the data block (472) and including entries in the third stream block (470) pointing to them. Additional stream blocks for the stream can be added as needed, and each new stream block can point back to the previous stream block. When a new stream is to be added, a new stream block that does not point back to a previous stream block can be added.

Each of the data blocks (432, 452, 462, and 472) can be multiples of system storage allocation units to improve system performance, such as improving write speeds. In this file (400), fixed sized files can be maintained by allowing streams to be truncated by invalidating data blocks in the streams either at the start or the end of the stream. Allocation blocks that are no longer used after truncation can be added to a free list of blocks. This free list can be used for appending new blocks to the file, to avoid the need to allocate new physical disk space.

Each stream block (460) can include fields such as the following

| Field | Type | Size | Description |
|---|---|---|---|
| PreviousBlockOffset | UInt64 | 1 | Block offset of the previous block in a linked list of stream blocks (450, 460, 470). A value of 0 terminates the linked list of stream blocks. |
| [DataBlockOffsets] | UInt64 | N * 8 | List of block offsets, with an offset for each data block in the stream. These offsets can act as pointers |

| Field | Type | Size | Description |
|---|---|---|---|
| | | | from the stream blocks to the corresponding data blocks. |

The data blocks (432, 452, 462, and 472) can include data supplied by an application or user. For example, as discussed below, each data block can include an event from an application trace (entry, exit, checkpoint, etc.), so that the file (400) can be an application trace log file.

3. Free Blocks

The FirstFreeExtentOffset field discussed above can point to the offset of the first free block extent in the file (400). For example, this value may only be used when the log file is closed properly. When opening an existing file (400), this value can be used to continue the use of free space in the log file for further writing. The first block in each block extent can include fields such as the following:

| Field | Type | Size | Description |
|---|---|---|---|
| NextBlockExtentOffset | UInt64 | 1 | The offset of the next free block extent in the log file. |
| NumberOfBlocksInExtent | UInt32 | 1 | The number of blocks in this extent. |

Free blocks can be tracked in contiguous extents or sequences because blocks can be allocated and freed the same way. Using a contiguous sequence of blocks where doing so is feasible can avoid file fragmentation and make file access faster.

The free block extent list can be used to record block extents that are made available through stream truncation (either adjusting StreamStart or StreamLength) or by deleting streams. Although an underlying implementation may allocate chunks of blocks to grow the log file, such additional new space can be managed outside the log file so that this additional new space is not available in the free block extent list.

4. Example of Maintaining Streams

Each stream in the file (400) can be referred to by its StreamStart field in the StreamBlockEntries table within the file block (410) and any extension blocks (420). A stream can logically start at an offset of zero. Streams can be truncated at both beginning and end of the stream, or alternatively, streams may be truncated only at the beginning of a stream, while new blocks are appended to the end of the stream. Accordingly, there may be virtual offsets at the beginning of a stream that appear to be part of the stream, but actually contain no data and are invalid offsets to read from or write to.

The StreamStart field in the StreamBlockEntries field of the file block (410) or extension file block (420) can indicate the first offset at which data in the stream is valid and at which data can be read or written. The StreamLength field in the StreamBlockEntries field of the file block (410) or extension file block (420) can be the offset immediately after the last data from the stream written to the file (400). Offsets greater than or equal to StreamStart and less than StreamLength can be valid and can be read from. Offsets after StreamStart can be valid to write to up to offset UInt64.MaxValue−1. Typically the value of StreamStart can be increased above its previous value to invalidate existing stream entries and free up the blocks used by the data at the start of the stream. The StreamStart is typically not reduced below its previous value so that the stream start offset only moves forward in the stream.

In a typical scenario information may be inferred from the values of StreamStart and StreamLength. For example, if StreamStart is not a multiple of BlockSize, this can indicate that the first data block in the stream is partially filled (with empty unused space at the beginning of the stream). Similarly, if the StreamLength is not a multiple of BlockSize, this can indicate that the last data block is partially filled (with unused space at the end of the stream). Changing the values of StreamStart and StreamLength typically does not change the physical offset of any existing data in the stream, although changing StreamStart to invalidate data blocks in the stream may destroy data in those invalidated data blocks. Because data in the stream is linked in a reverse order singly linked list, a stream block referenced by a file block or extension block can be considered to include the data block containing the offset specified by StreamLength. If StreamStart is equivalent to StreamLength, this can indicate that no data blocks are allocated for the stream. If StreamLength is a multiple of BlockSize, this can indicate that no data block is allocated for that position, so that a data block will be allocated next time a byte is appended. Stream blocks are typically not allocated if they would contain zero data block references. Accordingly, for a zero-length stream, no matter the StreamStart and StreamLength offsets, metadata blocks may not be included in the file for the stream.

IV. Partitioned Lists as Application Tracing Logs

Partitioned lists can be beneficial for use as application trace logs. Reading a partitioned application trace log and constructing a call tree to display to the user will now be discussed. A trace log can include various event items that represent events when an application is being traced. These can be standard types of events that are recorded during application tracing, but can also include the recording of checkpoints at the beginning of event item partitions, as discussed below. For example, in addition to the checkpoints, the event items can include enter event items, which record when a function begins executing, and exit events, which record when a function returns to its caller.

Typically in order to build a call tree from this data, the entire log would be read, and a tree structure would be built in memory, representing the call tree in its entirety. However, the memory requirements increase with the size of the log and many logs are very large. Even with unlimited memory, users can experience long delays before seeing even a portion of the tree because a given node in the tree typically cannot be displayed until the tree-building process knows whether the node has children (descendents directly below the node). For the root node of the tree, this is typically not known until the entire log has been read. To provide a good call tree visualization experience, it can be beneficial to have a data structure that enables the call tree to be loaded piecemeal and in particular to have a fast technique for loading a particular node's children.

Such a data structure can include an application trace log formatted as a partitioned list, and including a checkpoint for each partition. For example, each checkpoint event can include the full call stack at a particular point during the target application's execution, the number of call frames the call stack has in common with the call stack of the previous checkpoint and the offset on disk of the last non-checkpoint event written to the log. While the application is running, the tracing can include not only recording when functions enter and exit, but also recording such checkpoints at regular intervals. The log file can be partitioned to form a partitioned list with a checkpoint for each partition, as illustrated in FIG. 5.

A. Partitioned Application Trace Event List

Figure 5:
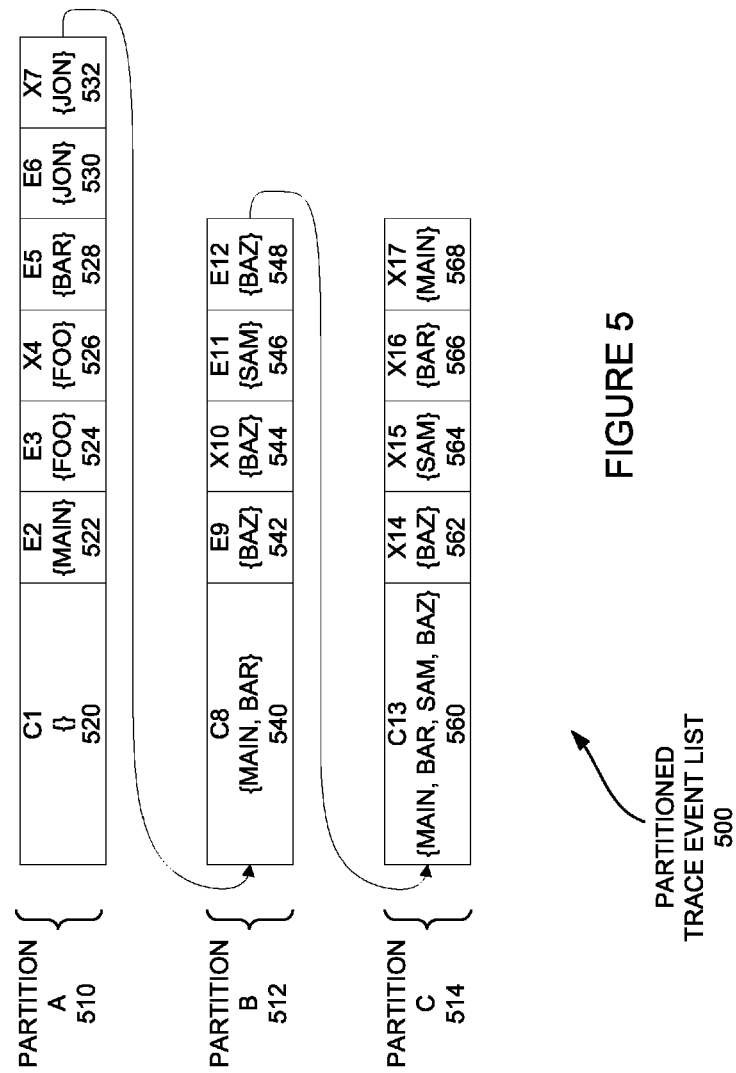
FIG. 5 is a block diagram of an example of a partitioned trace event list.

Referring to FIG. 5, an example of processing a partitioned trace event list (500) to generate and maintain an application call state stack will be discussed. As will be discussed below with reference to FIG. 7, such a call state stack can be used to generate part or all of an application call tree.

The partitioned list (500) can include three partitions: partition A (510), followed in time by partition B (512), followed in time by partition C (514). Each partition (510, 512, and 514) can include one or more events as partition items, indicated by blocks in FIG. 5. In the illustration of FIG. 5, each block includes an indication with an alphabetic character followed by a numeric character. The alphabetic character indicates the type of event, where C indicates a checkpoint (with brackets enclosing a list of names of call stack frames at that point), E indicates an entry into a function (with brackets enclosing the function name), and X indicates an exit from a function (with brackets enclosing the function name). The numeric character following each of these alphabetic characters indicates the point in time relative to the other partitions, with 1 being first and 17 being last in the illustrated example.

Accordingly, in this example, partition A (510) includes a checkpoint C1 (520), which indicates an empty call stack ({ }) because that checkpoint is the beginning of the sequence. Following the checkpoint C1 (520), partition A (510) includes the following event items: E2 (522), indicating entry into MAIN; E3 (524), indicating entry into FOO; X4 (526), indicating exit from FOO; E5 (528), indicating entry to BAR; E6 (530), indicating entry to JON; and X7 (532), indicating exit from JON. Partition B (512) includes a checkpoint C8 (540) that follows event item X7 (532) and indicates the call stack at that point has the following frames: {MAIN, BAR}. Following the checkpoint C8 (540), partition B includes the following event items: E9 (542), indicating entry to BAZ; X10 (544), indicating exit from BAZ; E11 (546), indicating entry to SAM; and E12, indicating re-entry to BAZ (548). Partition C includes a checkpoint C13 (560), indicating the current call stack has the following frames: {MAIN, BAR, SAM, BAZ}. Following the checkpoint C13 (560), partition C includes the following event items: X14 (562), indicating exit from BAZ; X15 (564), indicating exit from SAM; X16 (566), indicating exit from BAR; and X17 (568), indicating exit from MAIN.

B. Call Tree Generation from Partitioned Application Trace Event List

Figure 6:
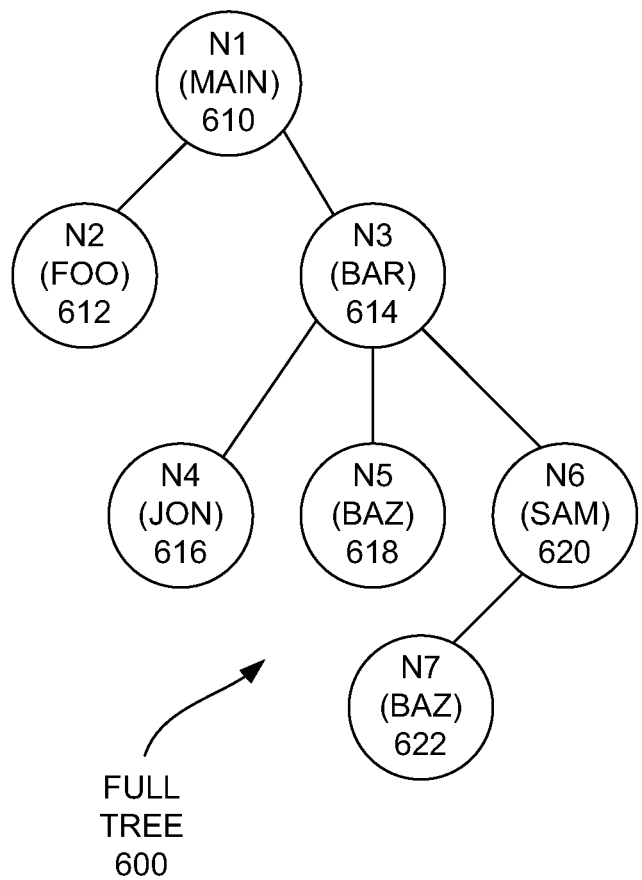
FIG. 6 is a schematic diagram illustrating a full call tree from the partitioned trace event list of FIG. 5.

Referring to FIG. 6 and still to FIG. 5, a full call tree (600) can be generated from the partitioned list (500) of FIG. 5. This can be done using a state machine, which will be discussed below. In the call tree (600), each node represents a call to a function, including the entry into the function and the exit from the function. The node illustrations in FIG. 6 each include a numeric indicator of the order in which the corresponding entries occurred. Accordingly, the root node N1 (610) corresponds to the entry item E2 (522) to MAIN. Node N2 (612), a child of node N1 (610), corresponds to the entry item E3 (524) into FOO from MAIN. Node N3 (614), also a child of node N1 (610), corresponds to the entry item E5 (528) into BAR from MAIN. Node N4 (616), a child of node N3 (614), corresponds to the entry item E6 (530) into JON from BAR. Node N5 (618), a child of node N3 (614), corresponds to the entry item E9 (542) into BAZ from BAR. Node N6 (620), a child of node N3 (614), corresponds to the entry item E11 (546) into SAM from BAR. Finally, node N7 (622), a child of node N6 (620), corresponds to the entry item E12 (548) into BAZ from SAM.

For a given partition, the initial and final checkpoints can be located (e.g., checkpoint C8 (540) and checkpoint C13 (560) for partition B (512)), and a portion of the call tree can be generated by processing just one partition worth of data, including the initial checkpoint. This portion is referred to herein as a tree slice (although a tree slice may be the combined slice form multiple partitions, but less than the full tree).

Figure 7:
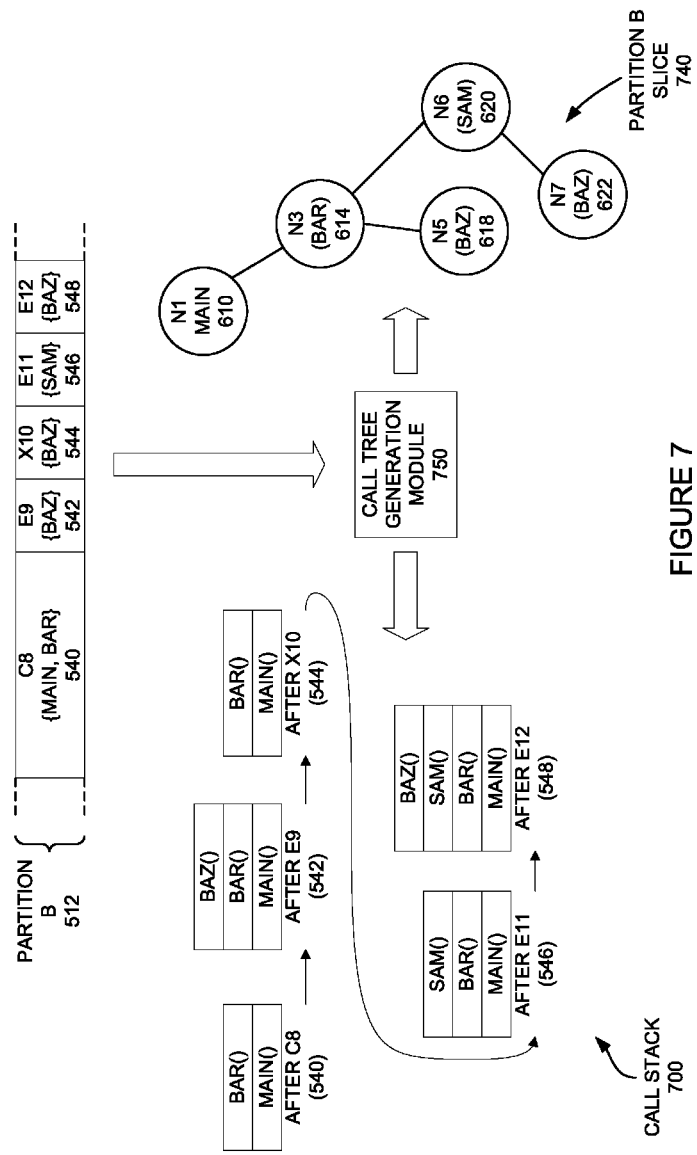
FIG. 7 is a schematic diagram illustrating a partition from the trace event list of FIG. 5, along with the call stack and partition call tree slice that can be generated when processing the partition.

Referring to FIG. 7, generation of such a tree slice for partition B (512) will be discussed. In FIG. 7, partition B (512) is reproduced for convenience at the top of the figure, a shadow stack (700) (an estimation of what a call stack in the corresponding running application would have included at the time) after processing each event item (540, 542, 544, 546, and 548) is illustrated in the lower left of the figure, and a tree slice (740) corresponding to partition B (512) is illustrated in the lower right of the figure. The shadow stack (700) is illustrated as being built from the bottom up. The shadow stack (700) can be maintained in a state machine as partition B (512) is processed. The state machine may also maintain other state information, such as the state of current exception handling routines, which may be recorded in the checkpoints and other events.

A call tree generation module (750) can access partition B (512), such as by accessing it through an index such as the indexes discussed above, and loading the partition into memory if the partition is not already loaded. The call tree generation module (750) can process the checkpoint C8 (540), which can result in the state machine extracting the current state of the shadow stack (700) and adding MAIN and BAR to the stack. Note that if the generation module (750) had been processing previous events and adding call information from those events to the shadow stack (700), but the shadow stack (700) did not have the full stack at that point, the generation module (750) could use the checkpoint to correct the shadow stack (700). The generation module (750) can also add corresponding nodes N1 (610) and N3 (614) to the stack.

The generation module (750) can then process entry and exit items. For each entry item, the generation module (750) can add an entry to the stack and add a node to the slice (740). For each exit item, the generation module (750) can remove an entry from the stack. For example, the generation module (750) can perform the following: process item E9 (542), add BAZ to the top of the stack (700), and add the corresponding node N5 (618) to the slice (740); process item X10 (544) and remove BAZ from the top of the stack (700); process item E11 (546), add SAM to the top of the stack (700), and add the corresponding node N6 (620) to the slice (740); and process item E12 (548), add BAZ to the top of the stack (700), and add the corresponding node N7 (622) to the slice (740).

Figure 8:
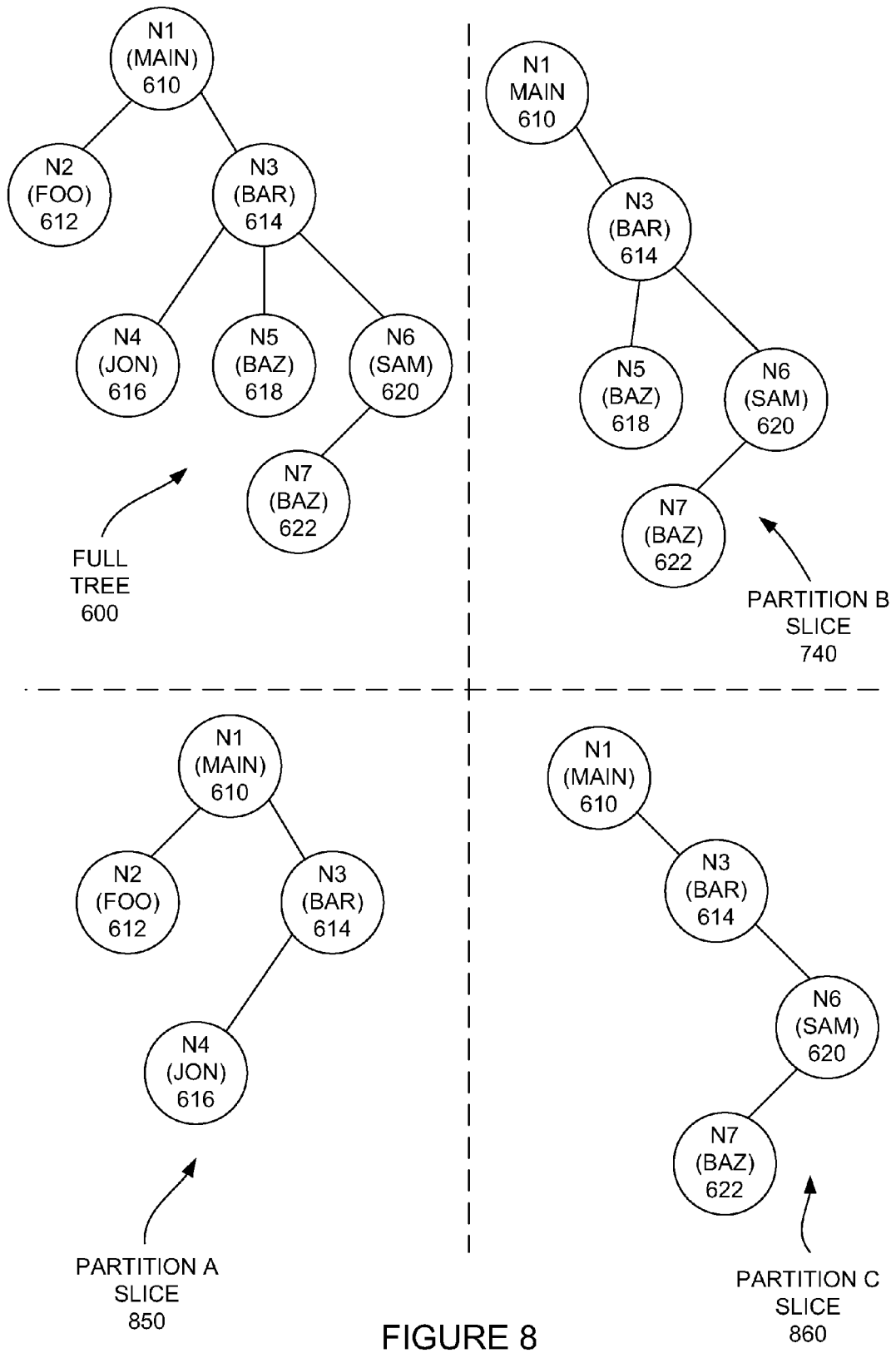
FIG. 8 is a schematic diagram illustrating the full call tree and the call tree partition slices that can be generated from the partitioned trace event list of FIG. 5.

FIG. 8 reproduces the full tree (600) (also in FIG. 6) and the partition B slice (740) (also in FIG. 7). FIG. 8 also illustrates a partition A slice (850) with node N1 (610), node N2 (612), node N3 (614), and node N4 (616) generated from partition A (510). In addition, FIG. 8 illustrates a partition C slice (860) with node N1 (610), node N3 (614), node N6 (620), and node N7 (622). The partition A slice (850) and the partition C slice (860) can be generated in the same manner as the generation of the partition B slice (740), discussed above.

Referring to FIG. 8 and FIG. 5, the full tree (600) can be generated by loading the partitions (510, 512, and 514) (if not already loaded), in any order, and processing them one at a time as described above. This can include adjusting the state machine using the checkpoints and other events, and adding nodes to the tree as they are indicated in the checkpoints or their entries are indicated in the entry events (if such nodes have not already been added to the tree when processing previous partitions). For example, after the partition A slice (850) is generated and displayed (i.e., at least some of the nodes can be displayed), partition C (514) can be loaded and processed by the call tree generation module (750), adding node N6 (620) and node N7 (622). Accordingly, the resulting call tree slice from partition A (510) and partition C (514) can then be displayed (i.e., at least some of the nodes can be displayed). That combined call tree slice can include node N1 (610), node N2 (612), node N3 (614), node N4 (616), node N6 (620), and node N7 (622). Partition B (512) can then be loaded and processed to add node N5 (618) to complete the full tree (600).

Referring still to FIG. 8, two types of tree nodes can be identified: non-spanning and spanning nodes. Non-spanning nodes are those that fall entirely within one slice (in the example of FIG. 8, node N2 (612), node N4 (616), and node N5 (618)), so that their descendents and related events are also within that one slice. Spanning nodes are those that span multiple slices (in the example of FIG. 8, node N1 (610), node N3 (614), node N6 (620), and node N7 (622)), so that their descendents and related events may be in multiple tree slices. Spanning nodes can occur when the entry and corresponding exit for a function occur in different partitions.

Fetching the children and other descendents of a non-spanning node can be accomplished by processing the partition where the node occurs because the node's descendents will also be contained within the non-spanning node's own slice.

To find the descendents of a spanning node, a search can be conducted across partitions corresponding to slices where the spanning node occurs. If only children of the node are being searched for, then the search can skip over nodes that are not processing at the level immediately below the level of the node. This search can take advantage of common frame count information on the checkpoint events. For example, each checkpoint can include a common frame count that indicates how many frames the checkpoint has in common with the immediately preceding checkpoint. Alternatively, the stack information in the checkpoints could be examined by a call tree generation module to determine the number of frames the checkpoints have in common. If a checkpoint for partition N has K frames in common with a checkpoint for partition N−1, then the nodes added in partition N (i.e., where entry items are found in partition N) will be at depths greater than K. Additionally, if partition N has less than K frames in common with a checkpoint for partition N−1, then the partition N−1 has exited from nodes at depths greater than K.

As an example, to find children of a spanning node at depth 5, adjacent partitions can be searched in both directions from a partition having a slice that includes the spanning node until a checkpoint with a common frame count of less than 5 is found. The first common frame count of less than 5 in a backward search indicates that the corresponding partition includes the entry for the spanning node, and the first common frame count of less than 5 in a forward search indicates that the exit for the spanning node has already occurred in the immediately preceding partition. To find children of the spanning node, checkpoints can be examined from the partition that includes the entry for the spanning node until the partition after the exit for the spanning node (where the common frame count is less than 5). Within that search, the non-checkpoint events for the partitions may only be loaded and examined for the partition that includes the entry for the spanning node, and for other partitions with checkpoints having a common frame count of 5. As noted above, common frame counts less than 5 can imply that the node has exited, and anything greater can imply that no entries for direct descendents of that node exist in that slice.

Accordingly, using the techniques and tools described above, all children of a root node in a call tree can be found, and a tree can be displayed with just the root node. The display may also include an expansion indicator for the root node, indicating that the node can be expanded (e.g., by displaying a plus symbol with the node). The grandchildren of the root node can then be found, allowing the children to be displayed, such as by displaying the children and including an expansion indicator for any children with descendents. The piecemeal generation and display of the call tree can continue in this manner. The generation can give priority to finding children that allow the expansion of nodes where user input requests the expansion.

V. Partitioned List Techniques

Several partitioned list techniques will now be discussed. Each of these techniques can be performed in a computing environment. For example, each technique may be performed in a computer system that includes at least one processor and a memory including instructions stored thereon that when executed by the at least one processor cause the at least one processor to perform the technique. Similarly, one or more computer-readable storage media may have computer-executable instructions embodied thereon that, when executed by at least one processor, cause the at least one processor to perform the technique.

Figure 9:
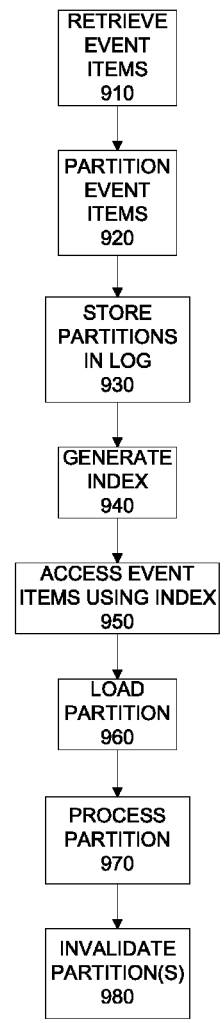
FIG. 9 is a flow diagram illustrating a partitioned list technique.

Referring to FIG. 9, a partitioned list technique will be discussed. The technique can include retrieving (910) event items from tracing a running application. Each event item can represent an event from the tracing. The event items can be partitioned (920) into multiple partitions, such as by generating partition blocks that point to data blocks including the event items. Each partition can include one or more event items. For example, each event item can represent an event from the tracing (e.g., an entry into a function, an exit from a function, a checkpoint, etc.). The partitions can be stored (930) in a log. For example, the log may be an application trace log file. Alternatively, the log may be in a structure that includes multiple files, such as an index file and a data file. An index to the partitions can be generated (940), such as by generating pointers to partition blocks in a file block of a log file. Moreover, the event items can be accessed (950) using the index.

One of the partitions can be loaded (960) into memory and processed (970). The processing (970) can include generating a call tree slice that is only a portion of a call tree, the slice corresponding to one or more event items in the partition. The slice can include one or more nodes represented in the partition, and the slice may also include one or more nodes that are parents of the one or more nodes represented in the partition.

The technique of FIG. 9 can also include invalidating (980) one or more partitions in the log. Additionally, storing (930) partitions in the log can include appending one or more partitions to the log in storage space previously allocated to one or more invalidated partitions.

The event items can also include one or more checkpoints that represent one or more call stacks of the running application. Such checkpoints may be stored in various ways. For example, in the file (400) discussed above, the checkpoints can be stored in the data blocks (such as in the first data block in each stream). Alternatively, the checkpoints could be stored in the stream blocks or elsewhere in the file (e.g., as part of StreamBlockEntries fields in the file and extension blocks).

Figure 10:
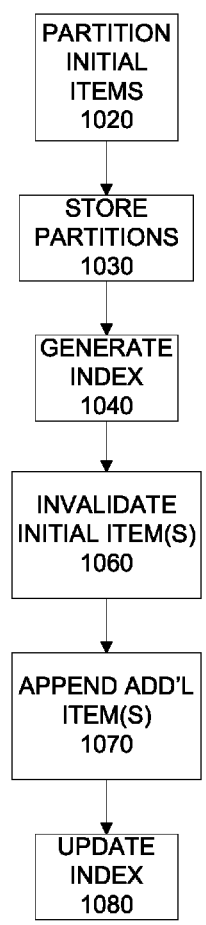
FIG. 10 is a flow diagram illustrating another partitioned list technique.

Referring to FIG. 10, another partitioned list technique will be discussed. This technique can include partitioning (1020) multiple initial items into multiple partitions. The partitions can be stored (1030) in a partitioned list in computer storage. An index to the partitions can be generated (1040), where the index includes a set of absolute logical index references corresponding to the initial items. For example, a logical index reference corresponding to an item may be an offset for the item that allows the item to be located. One or more initial items can be invalidated (1060), and one or more additional items can be appended (1070) to the partitioned list in a storage space previously occupied by one or more invalidated initial items. This may include storing in logical storage space previously occupied by the invalidated item(s), even if the additional items are not stored in the same physical space. For example, in many solid state storage devices, when data is modified it is often rewritten to a new physical location for wear leveling purposes, but the allocated logical storage space is the same. Additionally, the index can be updated (1080) to omit one or more references to the one or more invalidated items and to include one or more references to the one or more additional items.

The initial items can represent events from tracing a running application, and the partitioned list can be in an application trace log file. Also, updating the index can be done without modifying the logical index references for initial items that are not invalidated. One or more of the logical index references can refer to one or more corresponding partitions of the plurality of partitions.

Figure 11:
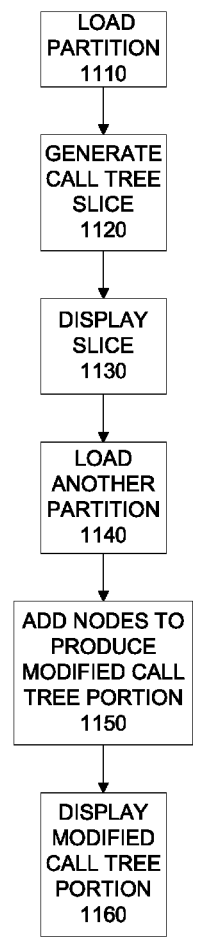
FIG. 11 is a flow diagram illustrating yet another partitioned list technique.

Referring to FIG. 11, yet another partitioned list technique will be discussed. The technique can include loading (1110) a partition of an application trace log into memory, where the log includes multiple partitions. A slice of an application call tree can be generated (1120) from the loaded partition. In addition, a representation of the slice can be displayed (1130) before an entire application call tree is generated from the log. Generating (1120) the slice can include generating an initial call tree portion using a call stack or shadow stack corresponding to the loaded partition and adding to the initial call tree portion using one or more events from the loaded partition.

In addition, the technique can include loading (1140) a second partition of the application trace log into memory. The second partition can be used to add (1150) one or more call tree nodes to the initial call tree slice, producing a supplemented call tree portion corresponding to the first partition and the second partition. In addition, the technique can include displaying (1160) a representation of the supplemented call tree portion.

Figure 12:
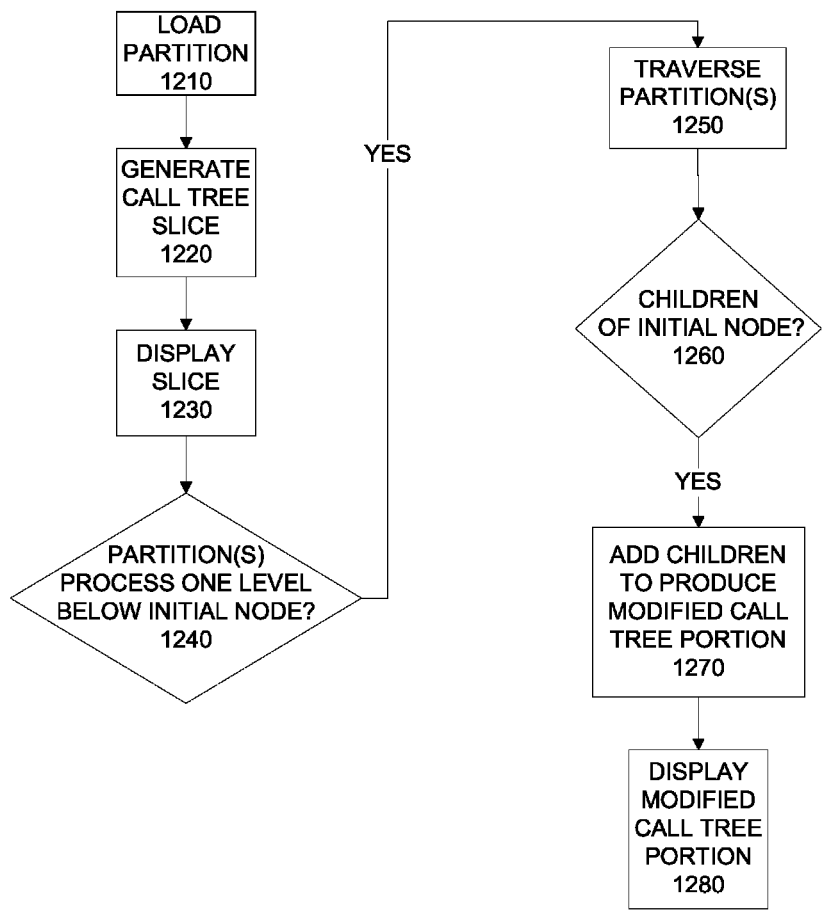
FIG. 12 is a flow diagram illustrating yet another partitioned list technique.

Referring to FIG. 12, yet another partitioned list technique will be discussed. The technique of FIG. 12 can include loading (1210) a partition, generating (1220) a call tree slice, and displaying (1230) the call tree slice, as in the technique described above with reference to FIG. 11. Generating (1220) the slice of the application call tree can include generating an initial call tree portion comprising an initial node at an initial level of the call tree portion. Moreover, the technique can also include determining (1240) whether one or more partitions in the application trace log represent processing at a level immediately below the initial level. Processing at a level immediately below the initial level means processing that can result in the addition of children at the level immediately below the initial level. If so, then the technique can include traversing (1250) the one or more partitions, and determining (1260) whether the one or more partitions indicate one or more children of the initial node. If so, then the technique can include adding (1270) the one or more children to the initial call tree portion, and displaying (1280) the resulting supplemented call tree portion. For example, this can include loading additional slices and linking them based on the spanning node technique described above.

Determining (1240) whether one or more partitions in the application trace log represent processing at the level immediately below the initial level may include analyzing one or more common frame indicators. The one or more common frame indicators can each indicate a number of call frames that a partition has in common with an adjacent partition in the application trace log. The one or more common frame indicators can be in the application trace log. Also, analyzing the one or more common frame indicators can include determining whether each of the one or more common frame indicators indicates a number of common frames that is the same as the initial level.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer system comprising:
at least one processor; and
a memory comprising instructions stored thereon that when executed by the at least one processor cause the at least one processor to perform acts comprising:
  loading a partition of an application trace log into memory, the log comprising a plurality of partitions;
  generating a slice of an application call tree, the slice being generated from the loaded partition, the call tree comprising a plurality of nodes that each represent a call in a running application, and the slice comprising one or more of the nodes, wherein generating the slice of the application call tree comprises generating an initial call tree portion comprising an initial node at an initial level of the initial call tree portion;
  displaying on a computer display a representation of the slice before an entire application call tree is generated from the log;
  determining that one or more partitions in the application trace log represent processing at a level immediately below the initial level, the determining that one or more partitions in the application trace log represent processing at the level immediately below the initial level comprising analyzing one or more common frame indicators, the one or more common frame indicators each indicating a number of call stack frames that a partition has in common with an adjacent partition in the application trace log;
  in response to determining that one or more partitions in the application trace log represent processing at the level immediately below the initial level, traversing the one or more partitions and determining that the one or more partitions indicate one or more children of the initial node; and
  in response to determining that the one or more partitions indicate one or more children of the initial node, adding the one or more children to the initial call tree portion to produce a supplemented call tree portion, and displaying the supplemented call tree portion.

2. The computer system of claim 1, wherein generating the slice comprises:

generating the initial call tree portion using a representation of a call stack corresponding to the loaded partition; and adding to the initial call tree portion using one or more events from the loaded partition.

3. The computer system of claim 1, wherein the partition is a first partition, the call tree slice is an initial call tree slice, and the acts further comprise:

loading a second partition of the application trace log into memory;

using the second partition to add one or more call tree nodes to the initial call tree slice, producing a supplemented call tree portion corresponding to the first partition and the second partition; and displaying a representation of the supplemented call tree portion.

4. The computer system of claim 1, wherein the one or more common frame indicators are in the application trace log.

5. The computer system of claim 1, wherein analyzing the one or more common frame indicators comprises determining whether each of the one or more common frame indicators indicates a number of common call stack frames that is the same as the initial level.

6. The computer system of claim 1, wherein the one or more common frame indicators comprise one or more indicators of one or more partitions representing processing while an application had entered a call represented by the initial node and had not yet exited the call represented by the initial node.

7. The computer system of claim 1, wherein the application trace log is divided into the partitions, with each of the partitions including one or more event items that can be manipulated together, and at least one of the partitions including multiple event items that can be manipulated together as a group.

8. A computer-implemented method comprising:

loading a partition of an application trace log into memory, the log comprising a plurality of partitions;

generating at least a portion of an application call tree, the call tree comprising a plurality of nodes that each represent a call in a running application, and the at least a portion of the application call tree comprising one or more of the nodes, wherein generating the at least a portion of the application call tree comprises:

generating an initial call tree portion comprising an initial node at an initial level of the initial call tree portion; and generating a supplemented call tree portion, the generating of the supplemented call tree portion comprising:

determining that one or more partitions in the application trace log represent processing at a level immediately below the initial level, the determining that one or more partitions in the application trace log represent processing at the level immediately below the initial level comprising analyzing one or more common frame indicators, the one or more common frame indicators each indicating a number of call stack frames that a partition has in common with an adjacent partition in the application trace log;

in response to determining that one or more partitions in the application trace log represent processing at the level immediately below the initial level, traversing the one or more partitions and determining that the one or more partitions indicate one or more children of the initial node; and in response to determining that the one or more partitions indicate one or more children of the initial node, adding the one or more children to the initial call tree portion to produce the supplemented call tree portion.

9. The method of claim 8, wherein the partition is a first partition, wherein generating the at least a portion of the application call tree comprises generating a slice of the application call tree, and wherein the method further comprises displaying the slice before all of the application call tree is generated.

10. The method of claim 8, wherein generating the at least a portion of the application call tree comprises generating a slice of the application call tree, wherein the method further comprises displaying the slice before all of the application call tree is generated, and wherein generating the slice comprises:

generating the initial call tree portion using a representation of a call stack corresponding to the loaded partition; and adding to the initial call tree portion using one or more events from the loaded partition.

11. The method of claim 8, wherein the one or more common frame indicators are in the application trace log.

12. The method of claim 8, wherein analyzing the one or more common frame indicators comprises determining whether each of the one or more common frame indicators indicates a number of common call stack frames that is the same as the initial level.

13. The method of claim 8, wherein the one or more common frame indicators comprise one or more indicators of one or more partitions representing processing while an application had entered a call represented by the initial node and had not yet exited the call represented by the initial node.

14. The method of claim 8, wherein the application trace log is divided into the partitions, with each of the partitions including one or more event items that can be manipulated together, and at least one of the partitions including multiple event items that can be manipulated together as a group.

15. A computer system comprising:

at least one processor; and a memory comprising instructions stored thereon that when executed by the at least one processor cause the at least one processor to perform acts comprising:

loading a partition of an application trace log into memory, the log comprising a plurality of partitions;

generating at least a portion of an application call tree, the call tree comprising a plurality of nodes that each represent a call in a running application, and the at least a portion of the application call tree comprising one or more of the nodes, wherein generating the at least a portion of the application call tree comprises:

generating an initial call tree portion comprising an initial node at an initial level of the initial call tree portion; and generating a supplemented call tree portion, the generating of the supplemented call tree portion comprising:

determining that one or more partitions in the application trace log represent processing at a level immediately below the initial level, the determining that one or more partitions in the application trace log represent processing at the level immediately below the initial level comprising analyzing one or more common frame indicators, the one or more common frame indicators each indicating a number of call stack frames that a partition has in common with an adjacent partition in the application trace log;

in response to determining that one or more partitions in the application trace log represent processing at the level immediately below the initial level, traversing the one or more partitions and determining that the one or more partitions indicate one or more children of the initial node; and in response to determining that the one or more partitions indicate one or more children of the initial node, adding the one or more children to the initial call tree portion to produce the supplemented call tree portion.

16. The computer system of claim 15, wherein the partition is a first partition, wherein generating the at least a portion of the application call tree comprises generating a slice of the application call tree, and wherein the acts further comprise displaying the slice before all of the application call tree is generated.

17. The computer system of claim 15, wherein generating the at least a portion of the application call tree comprises generating a slice of the application call tree, wherein the acts further comprise displaying the slice before all of the application call tree is generated, and wherein generating the slice comprises:

generating the initial call tree portion using a representation of a call stack corresponding to the loaded partition; and adding to the initial call tree portion using one or more events from the loaded partition.

18. The computer system of claim 15, wherein the one or more common frame indicators are in the application trace log.

19. The computer system of claim 15, wherein analyzing the one or more common frame indicators comprises determining whether each of the one or more common frame indicators indicates a number of common call stack frames that is the same as the initial level.

20. The computer system of claim 15, wherein the one or more common frame indicators comprise one or more indicators of one or more partitions representing processing while an application had entered a call represented by the initial node and had not yet exited the call represented by the initial node.

* * * * *